United States Patent Office 3,190,936
Patented June 22, 1965

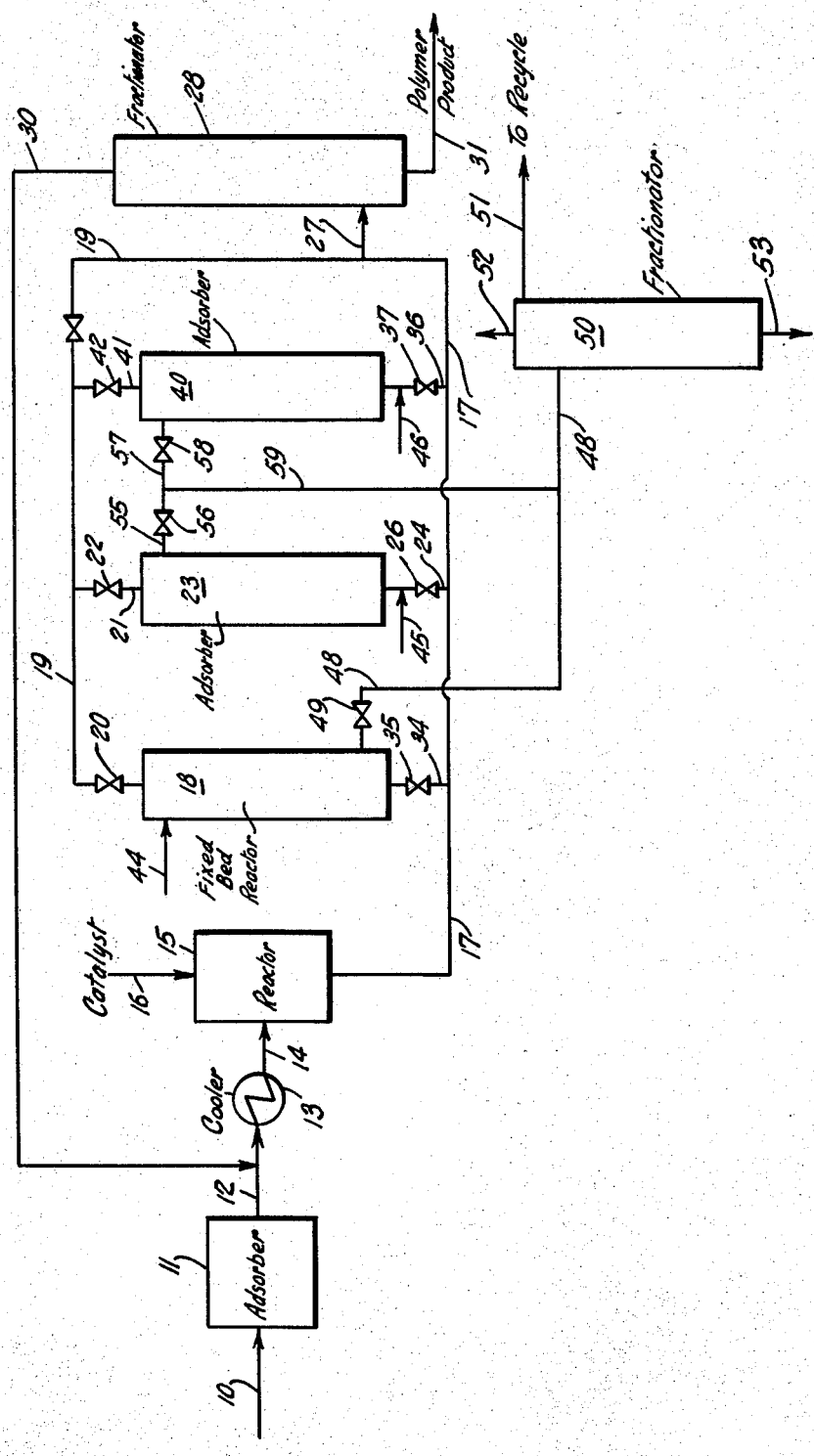

3,190,936
PROCESS FOR REGENERATING AN ADSORBENT AND A CATALYST SUPPORT IN A POLYMERIZATION OPERATION
Edward T. Child and William L. Lafferty, Jr., Fishkill, N.Y., assignors to Texaco Inc., New York, N.Y., a corporation of Delaware
Filed Feb. 16, 1961, Ser. No. 89,738
2 Claims. (Cl. 260—683.15)

This invention relates to a method for regenerating exhausted or spent adsorbent and catalyst support compositions employed in the polymerization of olefins by treating the compositions with a particular solvent mixture and then drying the compositions at an elevated temperature.

Earlier-filed, commonly-assigned, copending applications have disclosed the use of adsorbents and of supported Friedel-Crafts catalysts that are highly effective for the polymerization of monoolefins. The adsorbents and the supports in the supported Friedel-Crafts catalyst are from the same classes of materials, namely activated carbon, silica, alumina and mixtures thereof. It has been found that the activity of the adsorbent and the effectiveness of the catalyst are gradually reduced during polymerization until both become substantially ineffective. Since the basic composition used as the adsorbent and as the support constitutes a significant part of the costs in the noted polymerization processes, it was realized that important economies could be effected if either the adsorbent or support material or both could be salvaged and regenerated for one or both of the above-noted functions.

The changes in the catalyst and in the adsorbent which result in compositions exhibiting reduced effectiveness or which are totally ineffective are not fully understood. It is postulated that the active Friedel-Crafts halide is changed at least in part to relatively ineffective complexes during polymerization and that some of this remains in the support while some is adsorbed by the adsorbents. It is further believed that a certain amount of polymer is occluded both on the catalyst and on the adsorbent during the polymerization reaction. In any event, neither the supported catalyst nor the adsorbent are effective for their respective functions.

Attempts were made to regenerate the compositions rendered ineffective due to the formation of inactive halide complexes and occluded polymer by a conventional regeneration procedure. An ineffective composition was heated in a dryer at 400° F. to remove flammable material and then heated to 1000° F. in a muffle furnace. This procedure was unsatisfactory. The adsorbed polymer was not removed in the dryer and caused ignition in the muffle furnace. In addition, the higher temperature employed in the muffle furnace appeared to impair the expected life of the composition.

The removal of catalyst complexes and occluded polymer was also attempted by washing the catalyst and the adsorbent with various hydrocarbons and polar solvents. No solvent was effective for removing both the polymer and the catalyst complexes and regeneration of the support and the adsorbent could not be effected.

A method has now been discovered for effectively removing the complexes and occluded polymer from the adsorbent and the support compositions thereby permitting the regeneration and reuse of these compositions in a polymerization process.

In accordance with this invention, a supported catalyst, comprising a Friedel-Crafts halide on a support, or an adsorbent either of which has become ineffective due to the formation of complexes and the deposition of occluded polymer on the surface of the composition, is contacted with a solvent mixture that is effective to remove both the complexes and polymer from the composition. Solvent mixtures which are effective for this purpose are comprised of a liquid hydrocarbon and of a polar compound.

More particularly, a solvent mixture for this process consists of a hydrocarbon and of a polar compound within certain proportions. An effective mixture is one in which the proportion of hydrocarbon to polar solvent on a weight basis ranges from 1:4 to 4:1. One or more compounds of each type may be employed so long as the total amount for each class of solvent falls within the specified proportions.

The compositions which can be beneficially treated by this process are catalysts comprising a Friedel-Crafts halide on a support and adsorbent materials. The support material and the adsorbent are characterized by being comprised of substances which will adsorb polar compounds and at the same time will not react with a Friedel-Crafts halide. Effective support materials and adsorbent materials include activated carbon, silica, alumina and mixtures thereof. Silica gel is preferred both as the adsorbent and as the support material for the catalyst.

The catalyst composition employed in olefin polymerization processes of present interest consists of a Friedel-Crafts halide on a support, the latter defined hereinabove. These catalysts generally consist of about 2% to 20% by weight of the Friedel-Crafts halide with the balance or 80% to 98% consisting of the support material. Particularly effective catalysts comprising a Friedel-Crafts halide on a support are titanium tetrachloride, boron trifluoride and aluminum trichloride.

The hydrocarbons which are employed in making up the solvent mixture are the normally liquid aliphatic hydrocarbons, particularly those having from 2 to 12 carbon atoms. Effective hydrocarbons are n-octane, n-pentane, isopentane, heptane, ethane, butane, propane and the like.

The polar solvents which can be employed include the lower aliphatic ketones and the lower aliphatic alcohols. These solvents are represented by the following formulas: R—CO—R and R—OH respectively in which R is an aliphatic radical having from 1 to 6 carbon atoms. Suitable polar solvents include acetone, diethyl ketone, ethyl alcohol, propyl alcohol and the like.

The compositions which are benefitted by this process are generally employed in a vessel having a fixed-bed of the composition. It will be appreciated, however, that this process is not limited to the manner of use of the composition. The composition is treated by contacting same with the solvent mixture at a temperature generally in the range of 50° to 150° F., preferably at 60° to 80° F. The vessel in which the solvent mixture and the composition are contacted may be agitated or the solvent mixture may be circulated over or through the composition to enhance the solubilization effect. Such treatment is continued until substantially all of the inactive halide complexes and occluded polymer are removed from the composition. After the foregoing treatment, the solvent mixture is removed from the composition by any convenient means. For example, the solvent mixture can be scrubbed from the composition with the aid of an inert gas, such as nitrogen, air or a gaseous hydrocarbon. Alternatively, the composition is washed with a liquid aliphatic hydrocarbon to remove the last traces of the solvent mixture. If desired, the last traces of the solvent mixture are removed by scrubbing with an inert gas at 50° to 450° F., preferably at 300° to 400° F Treatment of the spent composition is preferably conducted by passing the solvent mixture over the composition in reverse flow or in the opposite direction from that employed during the preceding polymerization. Thereafter, the solvent mixture containing both the dissolved polymer and halide complexes is neutralized with caustic and treated in a fractionator to separate the undesirable components and effect recovery of the solvent for recycle in this regeneration process.

While both the adsorbent and the catalyst support are rendered ineffective for their respective functions in an olefin polymerization process, it is not always desirable to immediately effect the regeneration of the adsorbent. As more fully pointed out in a commonly-assigned, copending application, the adsorbent in certain olefin polymerization processes while no longer effective as an adsorbent nevertheless begins to exhibit catalytic properties similar to those initially possessed by the supported catalyst. When this is observed, it is ofen economically feasible to direct the feed stream containing olefin monomer into contact with the adsorbent exhibiting catalytic activity to maximize the amount of polymer produced from the catalyst consumed by the process. As will be apparent from the foregoing, the compositions beneficially treated by this process can be continuously recycled in a polymerization process. Silica gel, for example, can be used as a support in a supported Friedel-Crafts catalyst and after regeneration by this process can be employed as an adsorbent to remove entrained catalyst from the effluent products stream. When it begins to exhibit a degree of catalytic activity due to the adsorption of catalyst, it can again be used as a supported catalyst and this cycle can be continuously repeated.

The operation of the instant process in relation to a complete polymerization procedure is described and illustrated below in connection with the accompanying drawing.

An isobutylene-containing charge stock from any suitable source is charged through pipe 10 into adsorber unit 11. The adsorber unit is filled with an adsorbing medium effective for removing water or moisture and other undesirable components in the isobutylene feed. Silica gel has been found most effective for this purpose, although other well known adsorbing mediums may also be employed. The dehydrated and purified isobutylene stream is passed through line 12 into heat exchanger 13 where it is adjusted to the temperature range at which the polymerization reaction is to be conducted depending on the catalyst being employed. Generally, the feed is cooled, although polymerization may be effected at a temperature in the range of −100° C. to about 150° C. The dehydrated isobutylene feed is passed through line 14 into reactor 15. The polymerization catalyst, a mixture of a Friedel-Crafts halide in an inert hydrocarbon solvent, such as pentane or the like, is added to the reactor through line 16.

Any conventional reactor may be employed in the first stage reaction of this process. A reaction vessel or tank having a mechanical mixing means or a stirrer is preferred. However, a tubular reactor in which polymerization takes place as the feed stream and catalyst is passed through the tube is also suitable. Both basic types of reactors, those designed for back-mixing of the reaction product and those preventing back-mixing, may be employed in the first stage of the process. Polymerization in the reactor is effected at a temperature in the range of −100° to 150° C. under a pressure in the range of 25 to 500 lbs. per square inch. Under the preferred operating conditions, isobutylene is converted to polyisobutylene in the amount of 40 to 95% generally after a residence time of about ½ to 3 hours.

The product from the reactor containing between 40 and 95% of polyisobutylene polymer is passed through line 17 and line 34 into fixed-bed reactor 18. This reactor is preferably a tower containing a fixed-bed of a supported catalyst. The catalyst employed is a Friedel-Crafts halide on a support material. This catalyst can be a freshly prepared lot of active metal halide on support material, or more preferably, may be formed by the adsorption of the active halide remaining in the polymer effluent in an adsorption step as explained hereinbelow.

Polymerization of substantially all of the isobutylene monomer present in the effluent from the first stage reaction is accomplished in the fixed-bed reactor on contact with the supported Friedel-Crafts catalyst at a temperature in the range of −100° C. to 150° C. The residence time in this reactor is of short duratioon, generally in the order of about 10 to 30 minutes. The reaction product from the fixed-bed reactor comprises the polyisobutylene polymer, hydrocarbon solvent and a minor amount of entrained and/or dissolved Friedel-Crafts halide.

The reaction product from the fixed-bed reactor is passed through lines 19 and 21 into adsorber unit 23. This unit is desirably in the form of a tower and contains an adsorbent effective to remove the catalyst from the reaction product. The reaction product is contacted with the adsorbent and the purified solution of polymer and hydrocarbon is passed through lines 24, 17 and 27 into fractionating column 28. In the fractionator, the solvent is separated and taken off through line 30 while the polymer product is recovered through line 31. The hydrocarbon solvent is recycled through line 30 and is re-employed by combining same with isobutylene feed upstream from the stirred reactor preferably before the feed enters the heat exchanger.

When the process is started up, tower 40 is a standby adsorber unit filled with adsorbent material. This unit provides the necessary flexibility for continuously processing the incompletely polymerized isobutylene from the first stage reactor after the catalyst in the second stage fixed-bed reactor has lost its effectiveness.

As noted above, the second stage reactor containing a supported catalyst becomes ineffective over extended use due to the buildup of polymer and the formation of non-active catalyst complexes. At the same time, the adsorber in adsorber unit 23 is adsorbing catalyst and as the catalyst builds up it is converted into a unit exhibiting substantial catalytic activity for polymerizing olefin monomers. At this juncture, it is feasible to stop the flow of the reaction product from the first stage of the process to fixed-bed reactor 18 and to divert this reaction product to unit 23 which has developed the function of a fixed-bed reactor. The isobutylene monomer remaining in the diverted stream is substantially completely polymerized to polyisobutylene polymer in unit 23 and the reaction product is passed through lines 21, 19 and 41 into adsorber unit 40 which contains an adsorbent effective for removing any catalyst remaining in the reaction product effluent. The catalyst-free reaction product from tower 40 is passed through lines 36, 17 and 27 into fractionator 28 wherein the polyisobutylene polymer is separated and recovered while the hydrocarbon solvent is recycled.

The catalytically ineffective second stage reactor is taken off-stream by interrupting the flow through lines 35 and 20. A mixed solvent, such as acetone and pentane, is introduced into this reactor through line 44. This solvent mixture removes occluded polymer and the inactive Friedel-Crafts halide complexes from the support material thereby leaving a relatively clean support material. The solvent is removed from the support material by washing with a hydrocarbon or by blowing with an inert gas, such as nitrogen or air as disclosed above. This material is now suitable for use as an adsorbent in the process and is retained in a standby capacity until the adsorbent in tower 40 becomes saturated and is no longer effective to remove entrained catalyst from the product stream.

The solvent mixture containing dissolved polymer and Friedel-Crafts halide complexes is passed through line 48 into fractionator 50. The solvent is separated from the polymer and metal halide and is retained for recycle in this step for salvaging and activating catalyst support material.

*Example I*

A silica gel adsorbent, which had been used in a process for producing polyisobutylene by the polymerization of isobutylene in the presence of boron trifluoride and which was saturated with catalyst complexes and occluded polymer and no longer effective in the polymerization process, was contacted with a solvent mixture consisting of 50–50 weight percent of acetone and pentane at 25° C. for approximately 5 hours. After substantially all of the catalyst complexes and occluded polymer were removed, the solvent was separated from the silica gel. The rinsed silica gel was then dried and regenerated with nitrogen at an inlet temperature of 350° F. for 6 hours after the outlet temperature had risen above 100° F. The regenerated silica gel had adsorbent properties equal to the original material.

In contrast to the foregoing, acetone or pentane, when employed separately, were ineffective for dissolving catalyst complexes and occluded polymer from silica gel and did not provide a way for regenerating the spent composition.

We claim:

1. In an operation wherein normally gaseous olefins are converted to polymers while in contact with a boron fluoride catalyst and in which there is employed a composition having adsorbent properties and effective as a support for said catalyst and for removing impurities from said polymers, said composition being selected from the class consisting of activated carbon, silica, alumina and mixtures thereof, which operation renders said composition ineffective by the occlusion of inactive halide complexes and polymers thereon, the method of regenerating said composition which comprises contacting said composition with a solvent mixture until substantially all of said occluded complexes and polymers are removed thereby regenerating said composition, said solvent consisting of pentane and acetone in the proportions of 1:4 to 4:1 respectively on a weight basis.

2. In an operation wherein normally gaseous olefins are converted to polymers while in contact with a boron fluoride catalyst and in which silica is employed, said silica having adsorbent properties and effective as a support for said boron fluoride catalyst and for removing impurities from said polymers, which operation renders said silica ineffective by the occlusion of inactive halide complexes and polymers thereon, the method of regenerating said silica which comprises contacting said silica with a solvent mixture until substantially all of said occluded complexes and polymers are removed thereby regenerating said composition, said solvent consisting of pentane and acetone in the proportions of 1:4 to 4:1 respectively on a weight basis.

References Cited by the Examiner

UNITED STATES PATENTS

| | | | |
|---|---|---|---|
| 1,905,087 | 4/33 | Goebel | 252—414 |
| 2,055,616 | 9/36 | Starr | 252—414 |
| 2,082,519 | 6/37 | Ruthruff | 260—683.15 |
| 2,254,618 | 9/41 | McMillan et al. | 260—683.74 |
| 3,042,730 | 7/62 | Sechrist et al. | 260—683.74 |

ALPHONSO D. SULLIVAN, *Primary Examiner.*